(12) United States Patent
Voss et al.

(10) Patent No.: US 7,389,852 B2
(45) Date of Patent: Jun. 24, 2008

(54) INTEGRATED HEAT EXCHANGER AND MUFFLER UNIT

(75) Inventors: Mark G. Voss, Franksville, WI (US); Liping Cao, Racine, WI (US); Gregory A. Mross, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 242 days.

(21) Appl. No.: 11/126,549

(22) Filed: May 11, 2005

(65) Prior Publication Data
US 2005/0284691 A1    Dec. 29, 2005

Related U.S. Application Data

(60) Provisional application No. 60/569,939, filed on May 11, 2004.

(51) Int. Cl.
*F01N 1/02* (2006.01)
*F28D 7/10* (2006.01)
*F28D 7/16* (2006.01)
*F01N 5/02* (2006.01)
*F02M 31/08* (2006.01)
*F28F 13/00* (2006.01)

(52) U.S. Cl. .................. 181/255; 181/250; 181/249; 181/283; 165/135; 165/159; 165/52; 165/136; 60/320

(58) Field of Classification Search .......... 181/255, 181/250, 249, 283, 211, 276, 272; 165/135, 165/145, 159, 51, 52, 136; 60/320
See application file for complete search history.

(56) References Cited

U.S. PATENT DOCUMENTS

| 1,684,186 | A |   | 9/1928  | Kysor |
|-----------|---|---|---------|-------|
| 1,700,841 | A | * | 2/1929  | Graul ........................... 165/51 |
| 1,715,630 | A | * | 6/1929  | Snell ............................ 165/51 |
| 1,724,559 | A | * | 8/1929  | Butler ....................... 440/88 L |
| 1,745,492 | A | * | 2/1930  | Kelch et al. ................... 165/51 |
| 1,975,861 | A | * | 10/1934 | Oldberg ..................... 181/250 |
| 2,128,469 | A | * | 8/1938  | Nibbs ......................... 165/281 |
| 3,043,098 | A | * | 7/1962  | Hannon ....................... 165/52 |

(Continued)

FOREIGN PATENT DOCUMENTS

DE    35 31 353 A1    3/1987

(Continued)

*Primary Examiner*—Edgardo San Martin
(74) *Attorney, Agent, or Firm*—Michael Best & Friedrich LLP

(57) ABSTRACT

An integrated heat exchanger and muffler unit (50,120,140) is provided for transferring heat between a first fluid and a second fluid, and for muffling the noise of the first fluid. The unit includes a housing (52) including a first inlet (60) for the first fluid, a first outlet (62) for the first fluid, a second inlet (64) for the second fluid, and a second outlet (66) for the second fluid. The unit (50,120,140) further includes a resonator (76) in the housing (52) and connected between the first inlet and outlet (60,62) to muffle noise in the first fluid, and a heat exchanger core (11,122) in the housing (52) connected to the first and second inlets and outlets to transfer heat between the first and second fluids. In one embodiment, the heat exchanger core surrounds the resonator. In another embodiment, the resonator surrounds the heat exchanger core.

33 Claims, 15 Drawing Sheets

U.S. PATENT DOCUMENTS

| | | |
|---|---|---|
| 3,280,903 A | 10/1966 | Stoddard, Jr. |
| 3,404,731 A | 10/1968 | Cushman |
| 3,420,052 A * | 1/1969 | Miller .................... 60/320 |
| 3,501,095 A * | 3/1970 | Peterson ............. 237/12.3 R |
| 3,760,870 A * | 9/1973 | Guetlhuber ............ 165/103 |
| 3,997,002 A * | 12/1976 | Baker et al. ............ 165/154 |
| 4,450,932 A | 5/1984 | Khosropour et al. |
| 4,621,677 A | 11/1986 | Suzuki et al. |
| 4,694,894 A * | 9/1987 | Kito et al. ............... 165/135 |
| 5,314,009 A * | 5/1994 | Yates et al. .............. 165/72 |
| 5,915,619 A * | 6/1999 | Etheve ............... 237/12.3 A |
| 5,979,598 A | 11/1999 | Wolf et al. |
| 6,416,892 B1 | 7/2002 | Breault |
| 6,796,402 B1 * | 9/2004 | Wagner .................. 181/238 |
| 7,063,134 B2 * | 6/2006 | Poole et al. ............. 165/163 |
| 2002/0039672 A1 | 4/2002 | Aramaki |
| 2002/0074105 A1 * | 6/2002 | Hayashi et al. ............ 165/43 |
| 2003/0064271 A1 | 4/2003 | Stenerson |

FOREIGN PATENT DOCUMENTS

| | | |
|---|---|---|
| JP | 225293 | 12/1984 |
| JP | 60-101486 | 6/1985 |
| JP | 2000-204941 | 7/2000 |

* cited by examiner

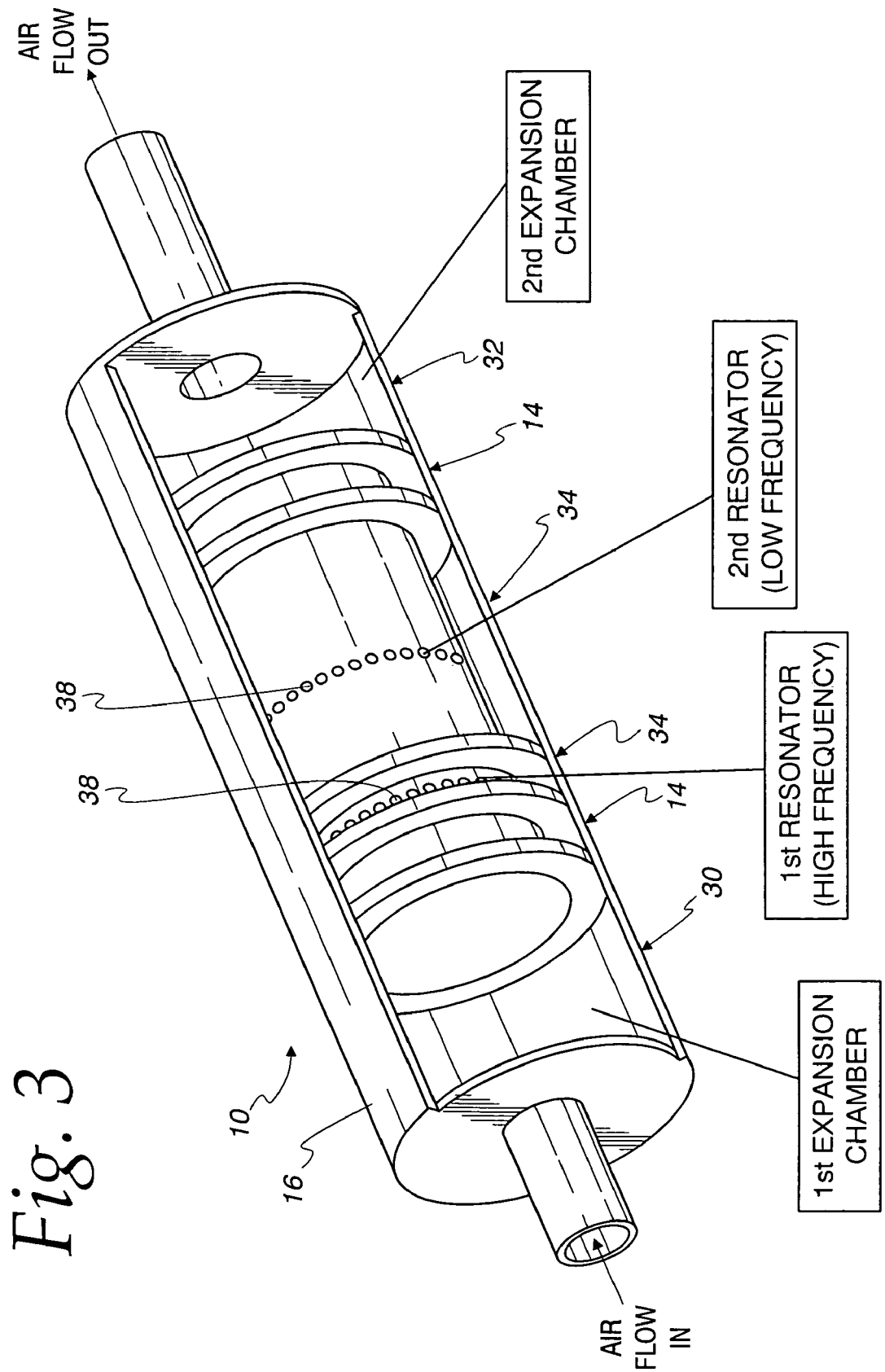

INTEGRATED HEAT EXCHANGER AND MUFFLER UNIT

CROSS-REFERENCE TO RELATED APPLICATION

This application claims priority to provisional application Ser. No. 60/569,939, filed May 11, 2004, entitled "Noise Reduction Heat Exchanger".

FIELD OF THE INVENTION

This invention relates to integrated heat exchangers and mufflers, and in more particular applications to integrated heat exchangers and mufflers for use in a pressurized fuel cell system at a location downstream from the air compressor for the cathode air flow.

BACKGROUND OF THE INVENTION

In a pressurized fuel cell system where air is needed as oxidant, an air compressor is generally in place to supply the air at higher pressure above the atmosphere. What comes with this compression process are the annoying noises due to the compressor's internal cyclic moving or rotating parts, as well as the high temperature air output. Therefore, in a typical system design of this kind, a noise reduction silencer/muffler usually follows the gas compressor to muffle the noise down to a certain acceptable level. A gas cooler in series then cools the hot gas down to protect the downstream equipment.

SUMMARY OF THE INVENTION

An object of this invention is to design an air compressor aftercooler that not only meets the heat transfer performance requirements but also satisfies the compressor noise reduction specification. By designing the two functions in one component, the fuel cell system is simplified and its cost is reduced.

A broader object of the invention is to provide a new and improved integrated heat exchanger and muffler unit.

It should be understood that while certain objects of the invention have been expressly described herein, every embodiment of the invention may not achieve all of the expressly described objects.

To achieve at least some of the objects of the invention, a compressed air aftercooler merges into itself the function of an air compressor muffler/silencer without adding many extra parts. Resonator holes need to be drilled or formed through the side bars (bar-plate type) or tube walls (charged air cooler type), and baffle plates are added if more than one resonator is desirable. The overall dimensions of the heat exchanger/muffler are comparable with the original heat exchanger design, only slightly longer longitudinally to achieve better muffling results.

In accordance with one feature of the inventions, an integrated heat exchanger and muffler unit is provided for transferring heat between a first fluid and a second fluid, and for muffling the noise of the first fluid.

In one feature, the unit includes a housing extending along an axis between a first end and a second end, the housing including an first inlet for the first fluid, a first outlet for the first fluid, a second inlet for the second fluid, and a second outlet for the second fluid, with the first inlet located in the first end of the housing and configured to direct a flow of the first fluid parallel to the axis, and the first outlet located in the second end and configured to direct a flow of the first fluid parallel to the axis. The unit further includes an expansion chamber in the housing and connected to one of the first inlet and outlet for the transfer of the first fluid between the expansion chamber and the one of the first inlet and outlet; a first fluid flow path in the housing and extending parallel to the axis between the first inlet and outlet and connected to the expansion chamber for the transfer of the first fluid between the first fluid flow path and the expansion chamber; a resonator in the housing and connected to the first fluid flow; and a second fluid flow path in the housing and extending between the second fluid inlet and the second fluid outlet in heat transfer relation with the first fluid flow path.

As one feature, the first and second fluid flow paths surround the at least one resonator.

As a further feature, the second fluid flow path surrounds the first fluid path.

According to one feature, the housing includes an outer cylindrical wall, an inner cylindrical wall, and an intermediate cylindrical wall located radially between the inner and outer cylindrical walls. The inner and intermediate cylindrical walls define the first fluid flow path, and the intermediate and outer cylindrical walls define the second fluid flow path.

In one feature, a fin is located in the first fluid flow path between the inner and intermediate cylindrical walls.

As one feature, the inner cylindrical wall defines a resonator chamber of the resonator, and a plurality of resonator orifices extend through the inner cylindrical wall to connect the first fluid flow path to the resonator chamber.

In accordance with one feature, the first and second flow paths are defined by a plurality of spaced parallel planar surfaces, and the resonator includes a resonator chamber that surrounds the first and second flow paths. In a further feature, the unit further includes a plurality of parallel plates interleaved with a plurality of bars, with the plurality of spaced parallel planar surfaces being surfaces of the plurality of parallel plates. In yet a further feature, the resonator further includes a plurality of orifices in selected ones of the plurality of bars, the selected ones enclosing the first flow path.

As one feature, the unit includes another expansion chamber in the housing and connected to the other of the first inlet and outlet and to the first fluid flow path to transfer the first fluid between the first fluid flow path and the other of the first inlet and outlet.

According to one feature, the unit includes another resonator in the housing and connected to the first fluid flow path.

In accordance with one feature of the invention, the unit includes a housing including an first inlet for the first fluid, a first outlet for the first fluid, a second inlet for the second fluid, and a second outlet for the second fluid. The unit further includes a first expansion chamber in the housing and connected to the first inlet to receive the first fluid therefrom; a second expansion chamber in the housing and connected to first outlet to direct the first fluid thereto; a first fluid flow path in the housing and extending from the first expansion chamber to the second expansion chamber; a resonator in the housing and connected to the first fluid flow path between the first and second expansion chambers; and a second fluid flow path in the housing and extending between the second fluid inlet and the second fluid outlet in heat transfer relation with the first fluid flow path, the first and second fluid flow paths surrounding the resonator.

In one feature, the unit includes an additional resonator in the housing and connected to the first fluid flow path between the first and second expansion chambers. In a further feature, the housing extends along an axis between and first end and a second end, each of the resonators includes a resonator chamber having a length dimension extending parallel to the axis, and the length dimension of one of the resonator chambers is unequal to the length dimension of the other resonator chamber.

According to one feature, the housing extends along an axis between a first end and a second end, and further including a plurality of resonators in the housing and connected to the first fluid flow path, each of the resonators including a resonator chamber having a length dimension parallel to the axis. In a further feature, the unit includes a fin located in the first fluid flow path and having a length parallel to the axis that is at least as long as the length dimension of any one of the resonator chambers, but is unequal to the combined length dimensions of all of the resonator chambers.

In accordance with one feature of the invention, the unit includes a housing including an first inlet for the first fluid, a first outlet for the first fluid, a second inlet for the second fluid, and a second outlet for the second fluid. The unit further includes a first expansion chamber in the housing and connected to the first inlet to receive the first fluid therefrom; a second expansion chamber in the housing and connected to first outlet to direct the first fluid thereto; a first fluid flow path in the housing and extending from the first expansion chamber to the second expansion chamber; a second fluid flow path in the housing and extending between the second fluid inlet and the second fluid outlet in heat transfer relation with the first fluid flow path; and a resonator in the housing and connected to the first fluid flow path between the first and second expansion chambers. The first and second flow paths are defined by a plurality of spaced parallel planar surfaces.

In a further feature, the resonator includes a resonator chamber that surrounds the first and second flow paths.

As a further feature, the unit includes a plurality of parallel plates interleaved with a plurality of bars, the plurality of spaced parallel planar surfaces being surfaces of the plurality of parallel plates.

According to one feature, the resonator further includes a plurality of orifices in selected ones of the plurality of bars, the selected ones enclosing the first flow path.

In accordance with one feature of the invention, the unit includes a housing including an first inlet for the first fluid, a first outlet for the first fluid, a second inlet for the second fluid, and a second outlet for the second fluid; a resonator in the housing and connected between the first inlet and outlet to muffle noise in the first fluid; and a heat exchanger core surrounding the resonator, the heat exchanger core connected to the first and second inlets and outlets to transfer heat between the first and second fluids.

As one feature, the unit further includes at least one additional resonator connected between the first inlet and outlet to muffle noise in the first fluid and surrounded by the heat exchanger core.

In accordance with one feature of the invention, the unit includes a housing including an first inlet for the first fluid, a first outlet for the first fluid, a second inlet for the second fluid, and a second outlet for the second fluid: a heat exchanger core in the housing and connected to the first and second inlets and outlets to transfer heat between the first and second fluids; and a plurality of resonators in the housing, each of the resonators connected between the first inlet and outlet to muffle noise in the first fluid, each of the resonators including a resonator chamber that surrounds the heat exchanger core and a plurality of resonator orifices in the heat exchanger core to connect the resonator chamber to a flow path for the first fluid. As one feature, the heat exchanger core includes a plurality of spaced planer surfaces that define flow paths for the first and second fluids.

According to one feature, the heat exchanger core is a bar-plate type construction.

Other objects, features, and advantages of the invention will become apparent from a review of the entire specification, including the appended claims and drawings.

BRIEF DESCRIPTION OF THE DRAWINGS

FIG. 3 is a perspective, partially broken view of a model of an integrated heat exchanger and muffler unit embodying the present invention;

DETAILED DESCRIPTION OF THE PREFERRED EMBODIMENT

Figure 1:
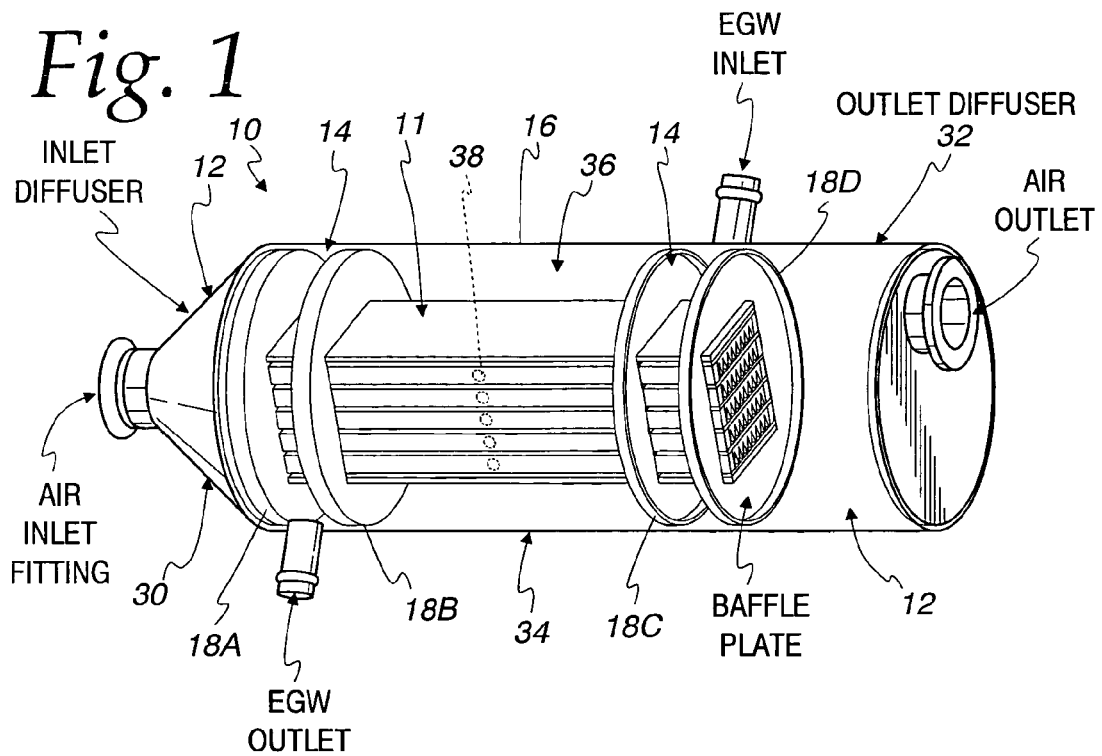
FIG. 1 is a perspective view, with some exterior features shown in phantom to allow viewing of certain interior features, of a heat exchanger construction that can be modified according to the invention to provide an integrated heat exchanger and muffler unit.

In an earlier conceptual design of an air aftercooler 10, a heat exchanger core 11 of bar-plate construction and all its air and coolant manifolds 12 and 14, respectively, could be brazed at one time using a cylindrical tube housing 16 and some internal baffle plates 18A-18D. FIG. 1 shows one possible configuration as an example of this design. The intention of the design was to avoid welding inlet/outlet distribution tanks on both the air side and coolant side of the heat exchanger core 11 for simplified manufacturing purpose.

Figure 2A:
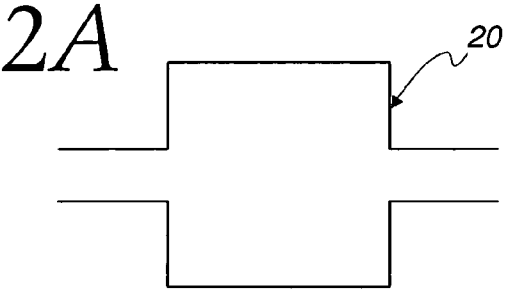
FIGS. 2A and 2B are diagrammatic representations of two basic types of noise reduction mechanisms.
Figure 2B:
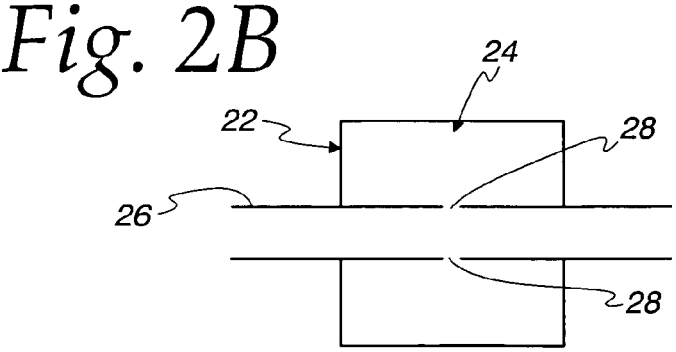

In addition to its aforementioned welding free merit, the configuration of this design also gives the chance to incorporate some noise reduction function in it without affecting its design performance as a heat exchanger. According to the plain wave acoustical theory, there are two basic types of noise reduction mechanism: expansion chamber and resonator, as illustrated in FIGS. 2A and 2B, respectively. The mechanism of the expansion chamber type muffler 20 is to reflect the sound pressure back towards its source and therefore reduce the transmitted noise level when sound wave propagation encounters area change. A typical resonator-type muffler 22 consists of an enclosed volume 24 surrounding a wave propagation pipe 26, the volume 24 being connected to the pipe 26 through orifices 28. The pressure fluctuations in the pipe 26 are branched off to the volume chamber 24 through the two small connecting orifices 28, with the transmitted noise level being thereby reduced. In practical muffler design, the two basic mechanism can also be combined to reach required noise reduction performance.

Figure 4:
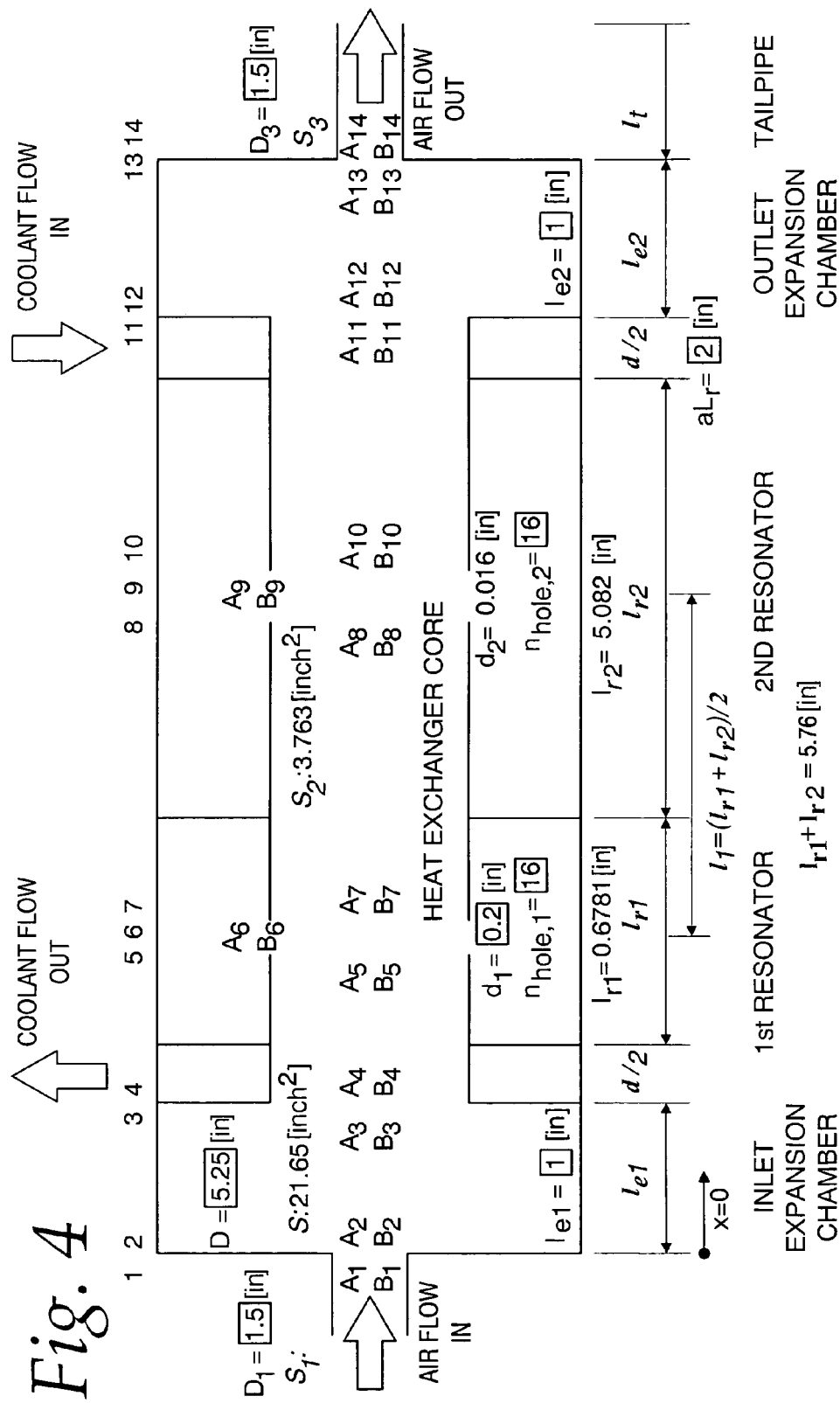
FIGS. 4 and 5 are diagrammatic illustrations of analytical models representing integrated heat exchanger and muffler units embodying the present invention.
Figure 5:
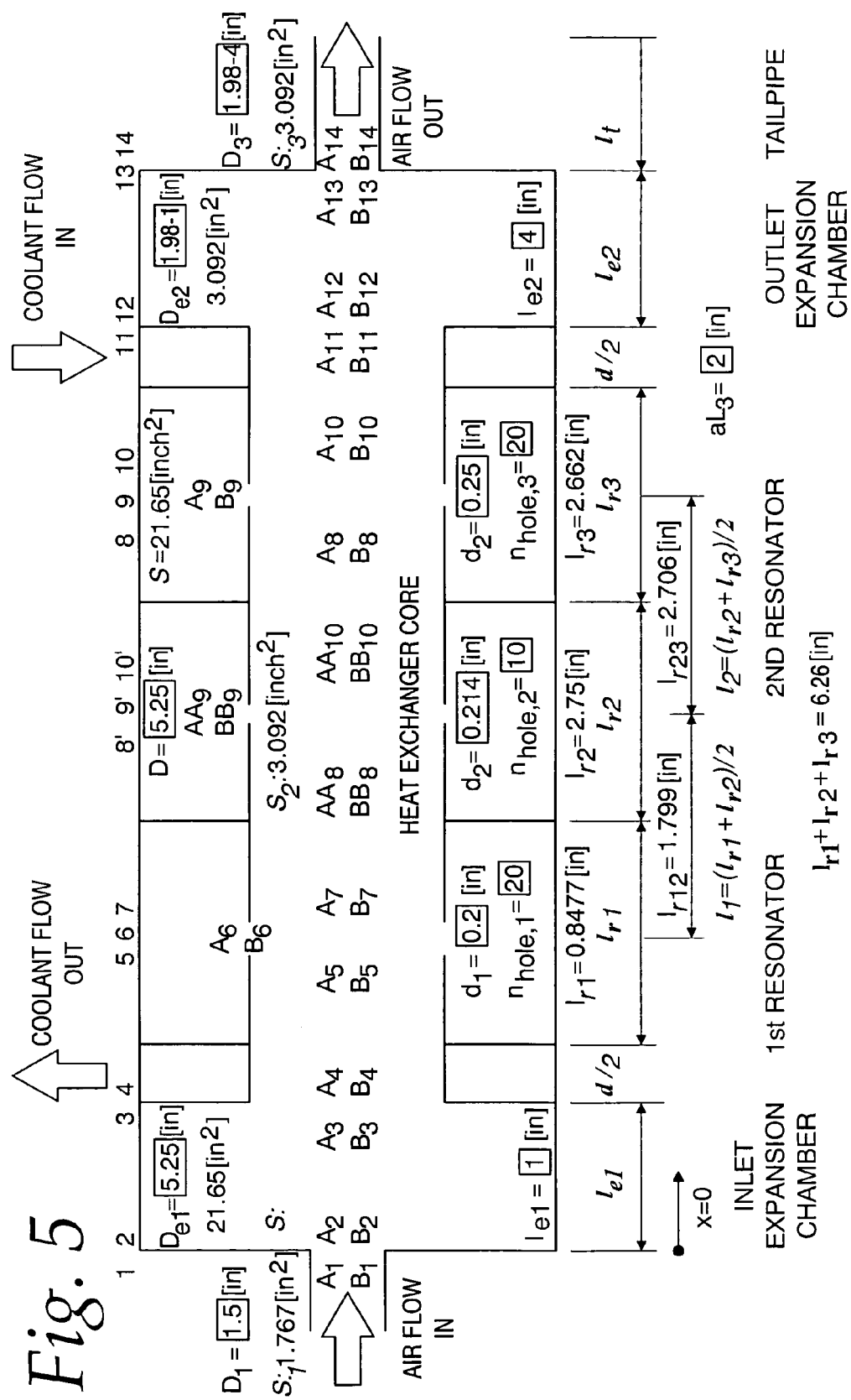

Referring back to FIG. 1, an inlet/outlet diffuser 30 or 32 (tube housing on both ends) could act as an expansion chamber type muffler, and the enclosed air volume between the two middle baffle plates 18B and 18C could be a resonator's 34 enclosed volume 36 if proper holes 38 (shown in phantom) are drilled through the side bars 40. If more resonators 34 are desirable from the sound muffling standpoint, additional baffle plates 18 can be added to separate the total enclosed volume into the desired number of resonator volumes without affecting its heat exchange performance. FIG. 3, for example, demonstrates a two-resonator type model based on the designed heat exchanger of FIG. 1. Additionally, FIGS. 4 and 5 diagrammatically illustrate two practical muffler models that could readily be implemented in the heat exchanger design show in FIG. 1. Acoustically, they consists of, in sequence, a first expansion chamber (inlet diffuser) 30, two/three resonators 34, and a second expansion chamber (outlet diffuser) 32. For simplicity, they are referred to a two-resonator model and three-resonator model respectively, dependent on the number of resonators they have.

Figure 6:
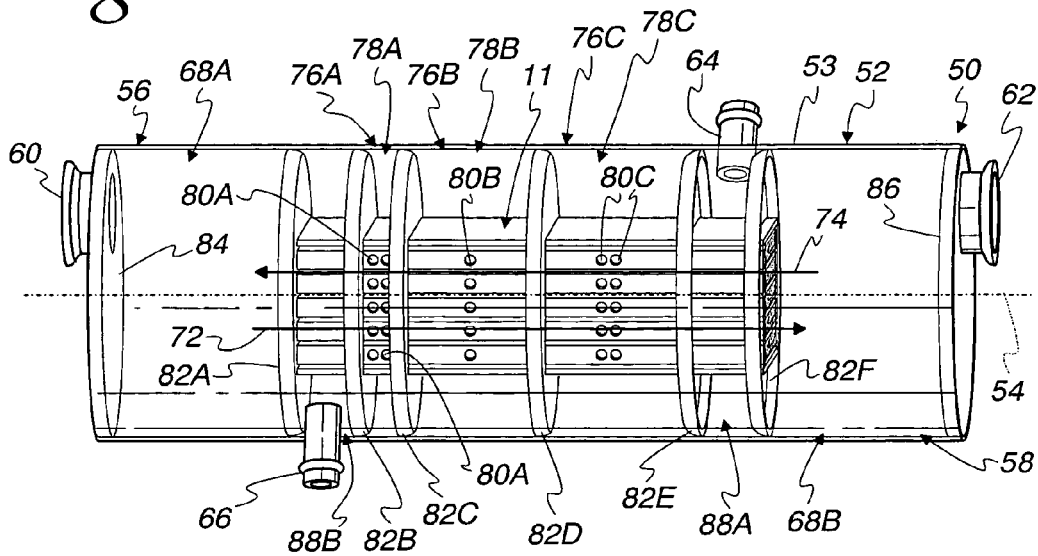
FIG. 6 is a perspective view, with some exterior features shown in phantom to allow viewing of certain interior features, of an integrated heat exchanger and muffler unit embodying the present invention.
Figure 7:
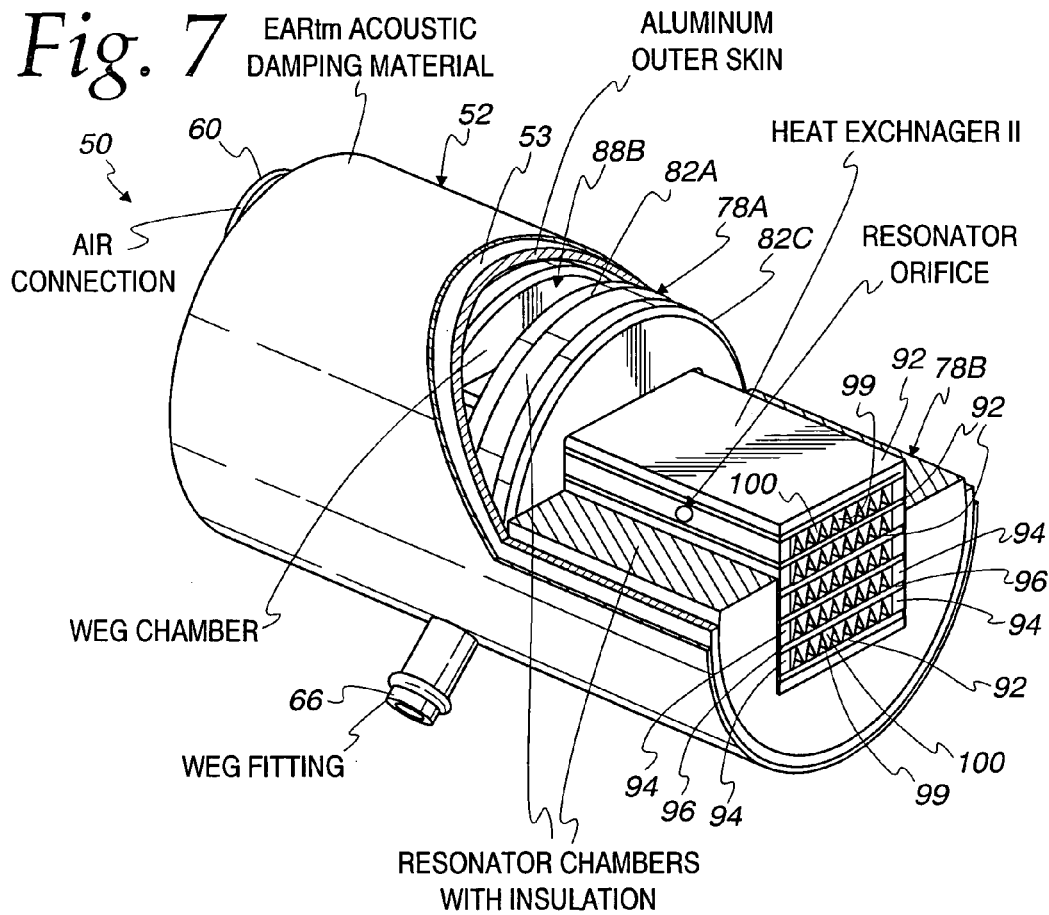
FIG. 7 is a perspective section view taken from line 7-7 in FIG. 6 showing additional details of the unit of FIG. 6.

FIGS. 6 and 7 show one form of an integrated heat exchanger and muffler unit 50 made according to the invention by making suitable modification to the aftercooler 10 of FIG. 1. The unit 50 includes a housing 52 including a cylindrical outer wall 53 extending along an axis 54 between a first end 56 and a second end 58. The housing includes an inlet 60 in the end 56 and an outlet 62 in the end 58 for a first fluid that is carrying noise, such as an air flow from a compressor. The housing 52 also includes an inlet 64 and an outlet 66 for a second fluid which passes through the heat exchanger core 11 in heat exchange relation with the first fluid. In the illustrated embodiment, the second fluid is a suitable coolant for cooling the air flow from a compressor, such as, for example, the WEG flow of a fuel cell system. The unit 50 further includes an inlet expansion chamber 68A and an outlet expansion chamber 68B, with the inlet 60 and outlet 62 configured to direct the first fluid flow parallel to the axis 54 to/from the expansion chambers 68A and 68B, respectively. The unit 50 further includes a first fluid flow path, shown schematically by the arrow 72, in the housing 52, and extending parallel to the axis 54 for directing the first fluid through the heat exchanger 11, and a second fluid flow path for the second fluid, shown schematically by the arrow 74, in the housing 52 for the directing the second fluid flow through the heat exchanger core 11. The unit 50 also includes three resonators 76A, 76B and 76C, with 76A being a high frequency resonator, 76B being a medium frequency resonator, and 76C being a low frequency resonator. Each of the resonators 76A-76C includes a resonator chamber 78A, 78B and 78C defined between the exterior of the heat exchanger core 10 and the interior of the cylindrical outer wall 53, and a plurality of resonator orifices 80A, 80B and 80C which are formed by providing holes in the side walls of the flow passages for the first fluid in the heat exchanger core 11. Baffles 82A, 82B, 82C, 82D, 82E and 82F are provided in the housing in the form of disk-shaped plates each with a lip for mating with the interior surface of the cylindrical wall 53 and a central opening that conforms to the exterior shape of the heat exchanger core 10. In the embodiment of FIG. 6, the expansion chamber 68A is defined between an end cap 84 and the baffle 82A, and the expansion chamber 68B is defined between an end cap 86 and the baffle 82F. Each of the resonator chambers 78A, 78B and 78C is defined between the exterior of the heat exchanger core 11 and the interior of the cylindrical wall 53 in the radial direction and between two of the baffles 82A-82F in the axial direction. The unit 50 also includes an inlet manifold 88A for the second fluid and an outlet manifold 88B for the second fluid, with the inlet manifold 88A being defined between the exterior of the heat exchanger core 11 and the interior of the cylindrical wall 53 in the radial direction and between the baffles 82E and 82F in the axial direction, and the outlet manifold 88B being defined between the exterior of the heat exchanger core 10 and the interior of the cylindrical wall 53 in the radial direction and between the baffle plates 82A and 82B in the axial direction.

As previously discussed, the core 11 can either be a bar-plate type or a charge air cooler type with tubes. With reference to FIG. 7, the core 11 of the illustrated embodiment is a bar-plate type and includes a plurality of parallel plates 92 spaced by bars 94 and 96, with the volume enclosed by the plates 92 and the bars 94 defining individual flow passages 98 for the flow path 72, and the volumes enclosed by the plates 92 and the bars 96 defining individual passages 99 for the flow path 74. Preferably, surface enhancements such as fins or turbulators are included in the flow passages, with serpentine fins 100 being shown in the flow passages of the illustrated embodiment. As also seen in FIG. 7, the exterior of the housing 50 can be coated with an acoustic damping material, and the resonator chambers can be filled with a suitable insulation.

Figure 8A:
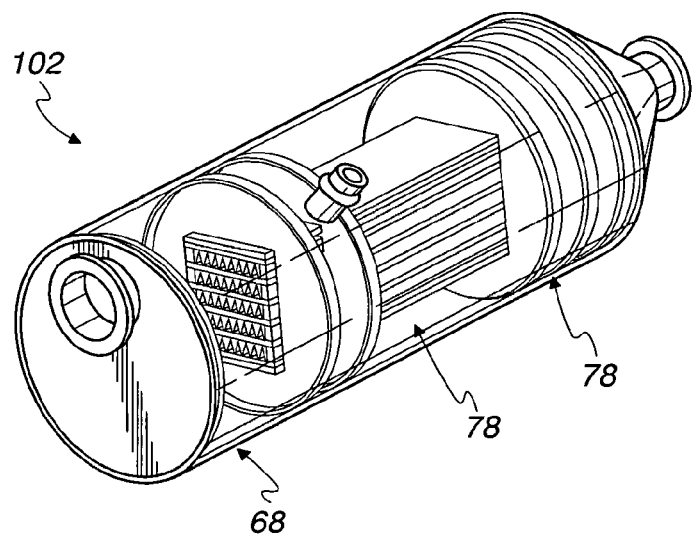
FIGS. 8A and 8B are perspective views, with some exterior features shown in phantom to allow viewing of certain interior features, showing another embodiment of a heat exchanger and muffler unit according to the invention.
Figure 8B:
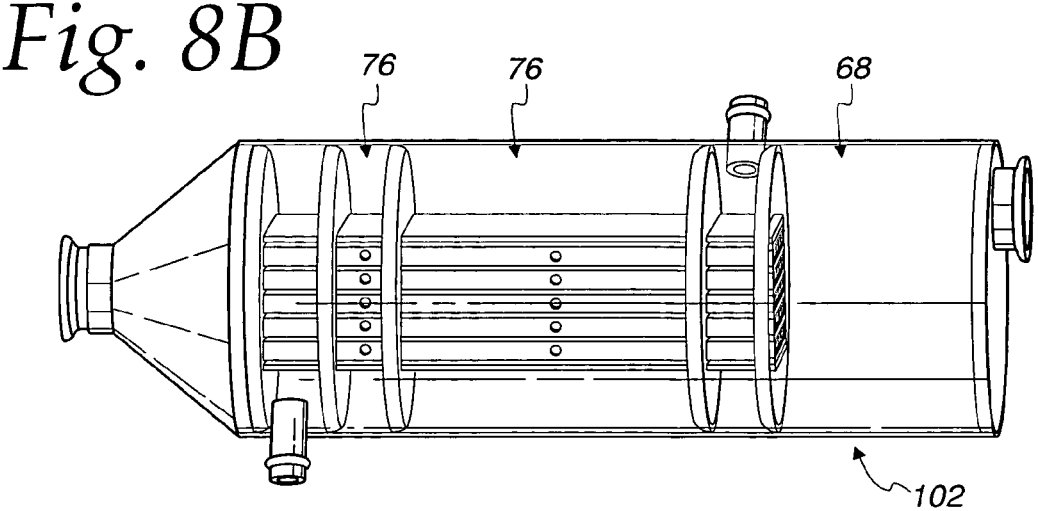
Figure 9A:
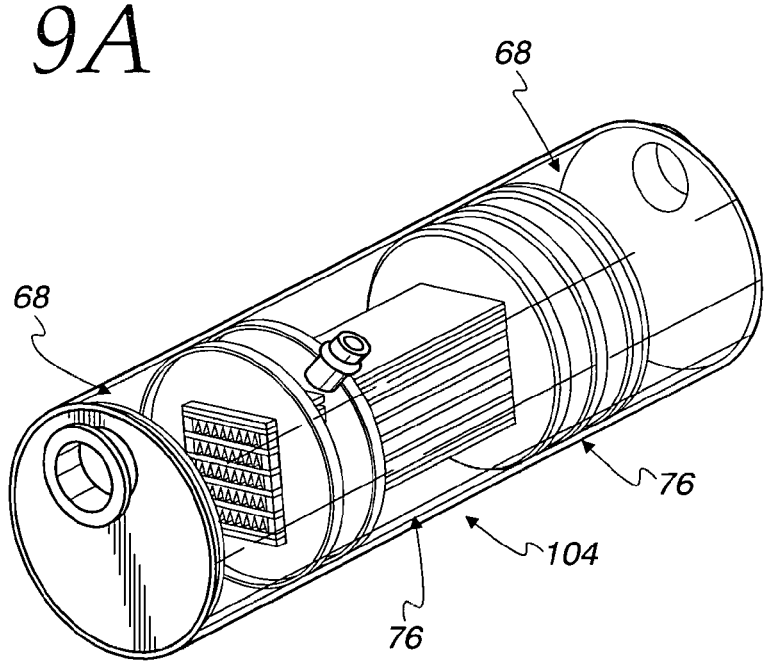
FIGS. 9A and 9B are perspective views, with some exterior features shown in phantom to allow viewing of certain interior features, showing another embodiment of a heat exchanger and muffler unit according to the invention.
Figure 9B:
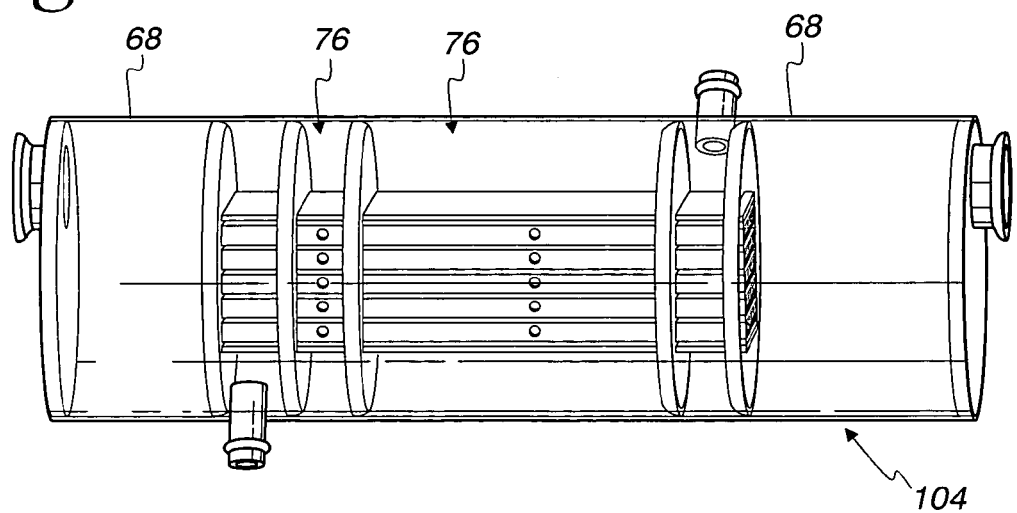
Figure 10A:
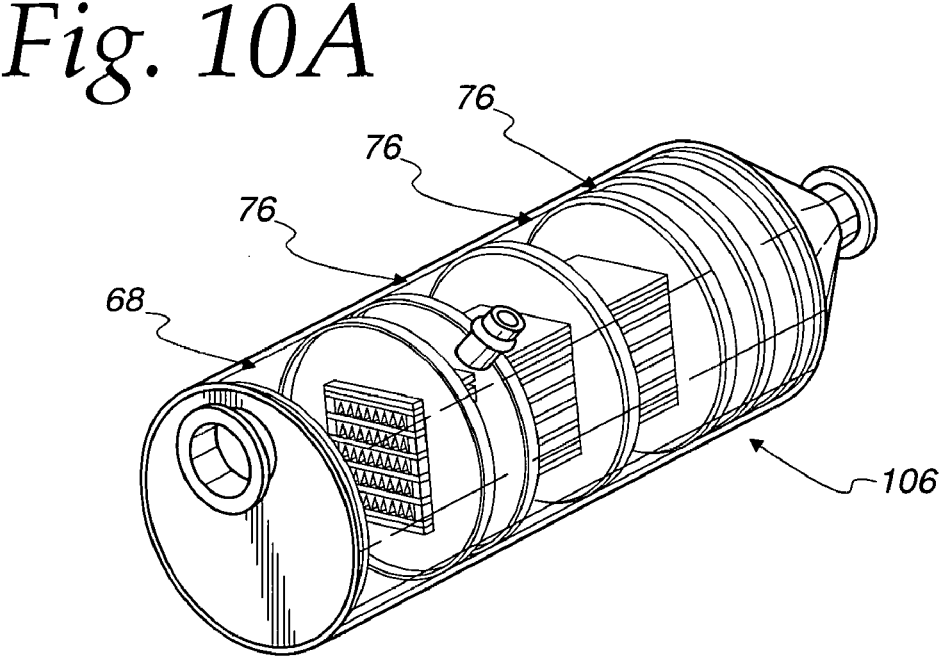
FIGS. 10A and 10B are perspective views, with some exterior features shown in phantom to allow viewing of certain interior features, showing another embodiment of a heat exchanger and muffler unit according to the invention.
Figure 10B:
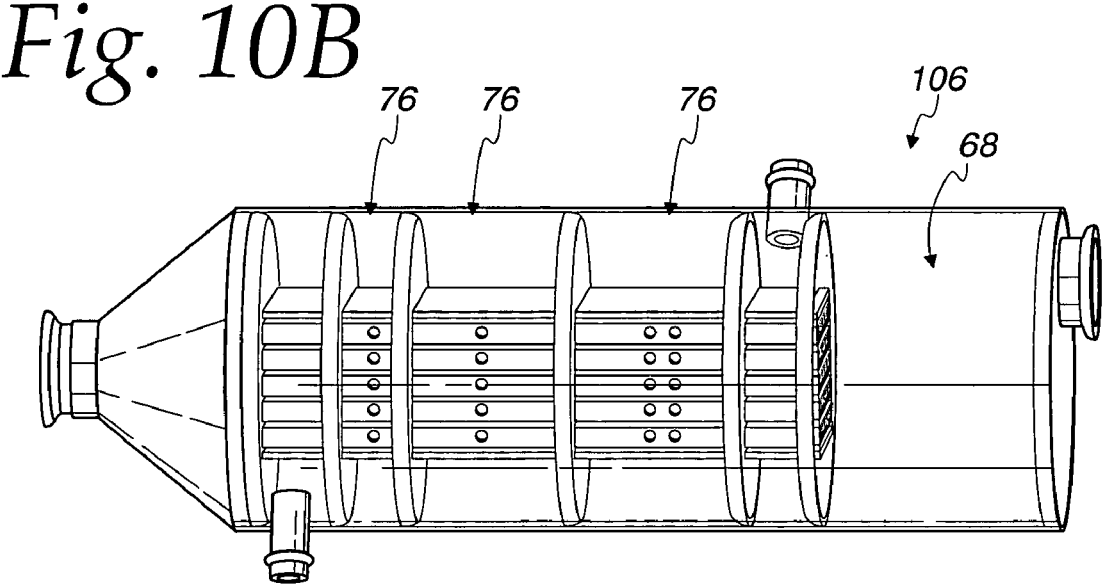

FIGS. 8A-10B illustrate three examples of additional embodiments of integrated heat exchanger and muffler units according to the invention, with like numbers indicating like components in the figures. Specifically, FIGS. 8A and 8B illustrate a unit 102 including two resonators 76 and one expansion chamber 68, FIGS. 9A and 9B illustrate a unit 104 having two resonators 76 and two expansion chambers 68, and FIGS. 10A and 10B illustrate a unit 106 having three resonators 76 and one expansion chamber 68.

Figure 11:
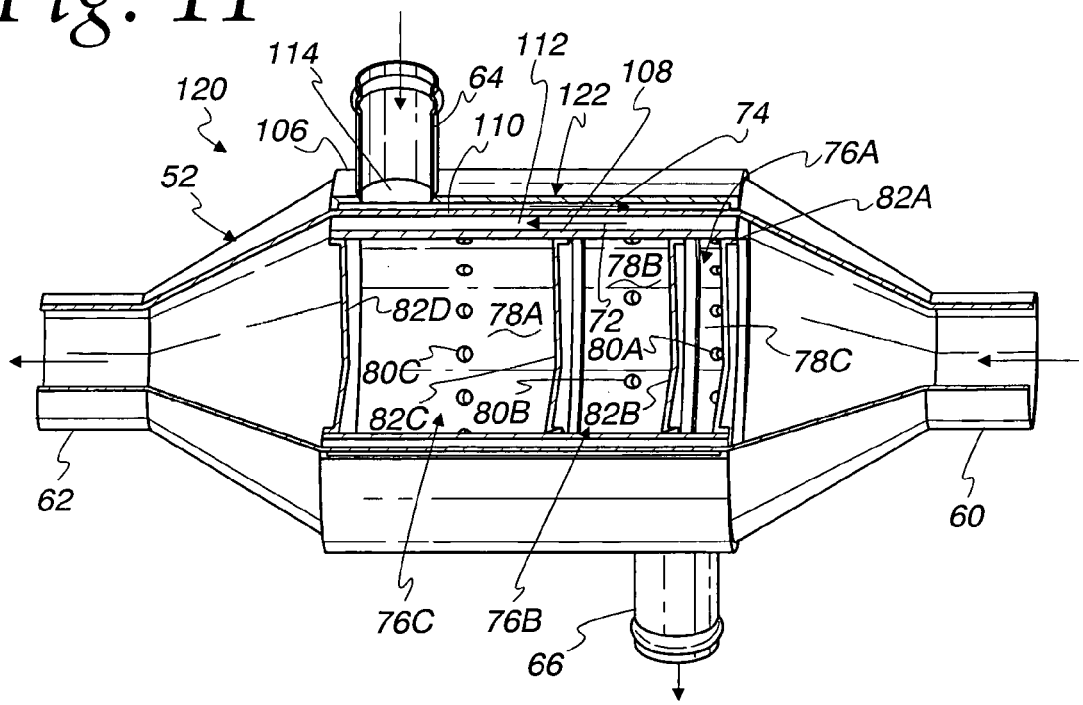
FIG. 11 is a broken, perspective view of another embodiment of an integrated heat exchanger and muffler unit according to the invention.

FIG. 11 illustrates another embodiment of an integrated heat exchanger and muffler unit 120, with like reference numbers indicating like components. The unit 120 differs from the previously described embodiments in that it has a heat exchanger core 122 that surrounds the resonators 76, rather than having the resonators 76 surround the heat exchanger core 10 as in their prior embodiments. In this embodiment, the heat exchanger core is defined by an outer cylindrical wall 106, an inner cylindrical wall 108 and an intermediate cylindrical wall 110 located between the outer and inner cylindrical walls 106 and 108, with the first fluid flow path 72 being defined between the inner and intermediate cylindrical walls 108 and 110, and the second fluid flow path 74 being defined between the outer and intermediate cylindrical walls 106 and 110. Preferably, a surface enhancement such as a serpentine fin 112 is provided in the fluid passage 72, and another surface enhancement such as fin 114 is provided in the fluid flow passage 74. The unit 120 includes baffles 82A, 82B, 82C and 82D which differ from the baffles 82 of the prior embodiments in that they do not have any central opening and they engage the inner cylindrical wall 108, rather than an outer cylindrical wall 53. Furthermore, the resonator chambers 78A-78C are defined between the interior surface of the inner cylindrical wall 108 and the respective baffles 82A-82D, and the resonator orifices 80A-80C extend through the inner cylindrical wall 108 to connect the resonator chambers 78A-78C to the fluid flow path 72.

Figure 12:
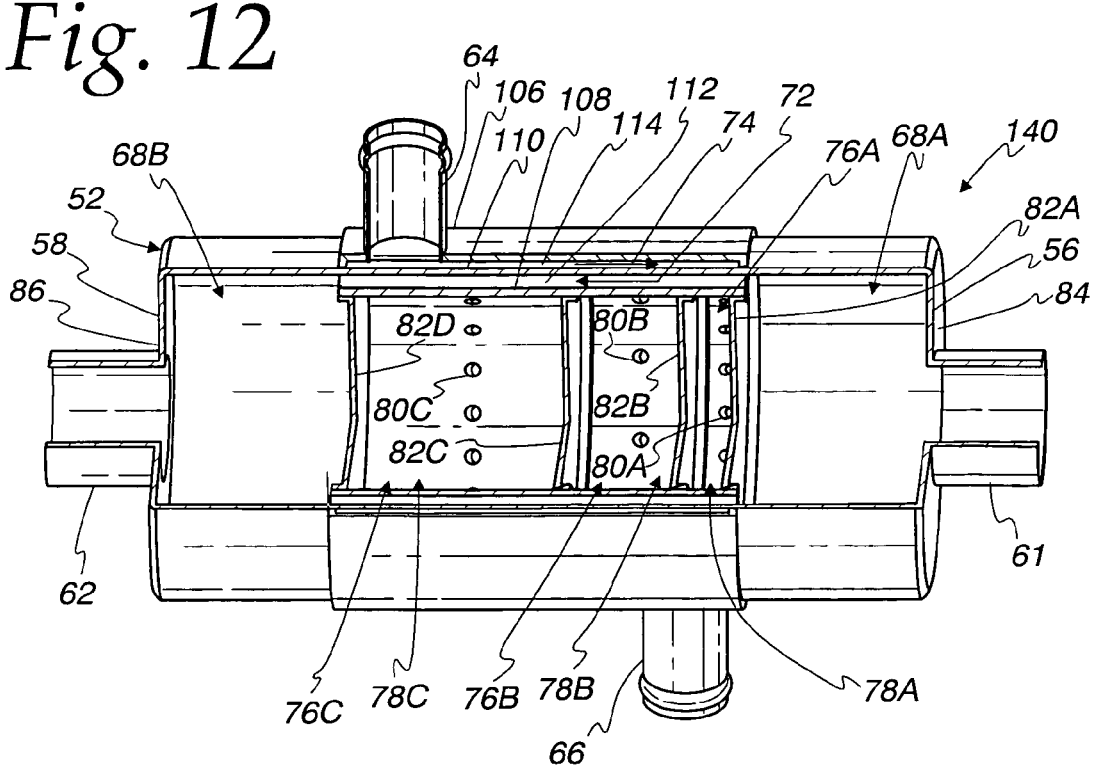
FIG. 12 is a broken, perspective view of yet another embodiment of an integrated heat exchanger and muffler unit according to the invention.

FIG. 12 shows another embodiment of an integrated heat exchanger and muffler unit 140 that is similar to the unit 120 of FIG. 7, but differs in that it includes expansion chambers 68A and 68B on either side of the heat exchanger core 122.

Figure 13:
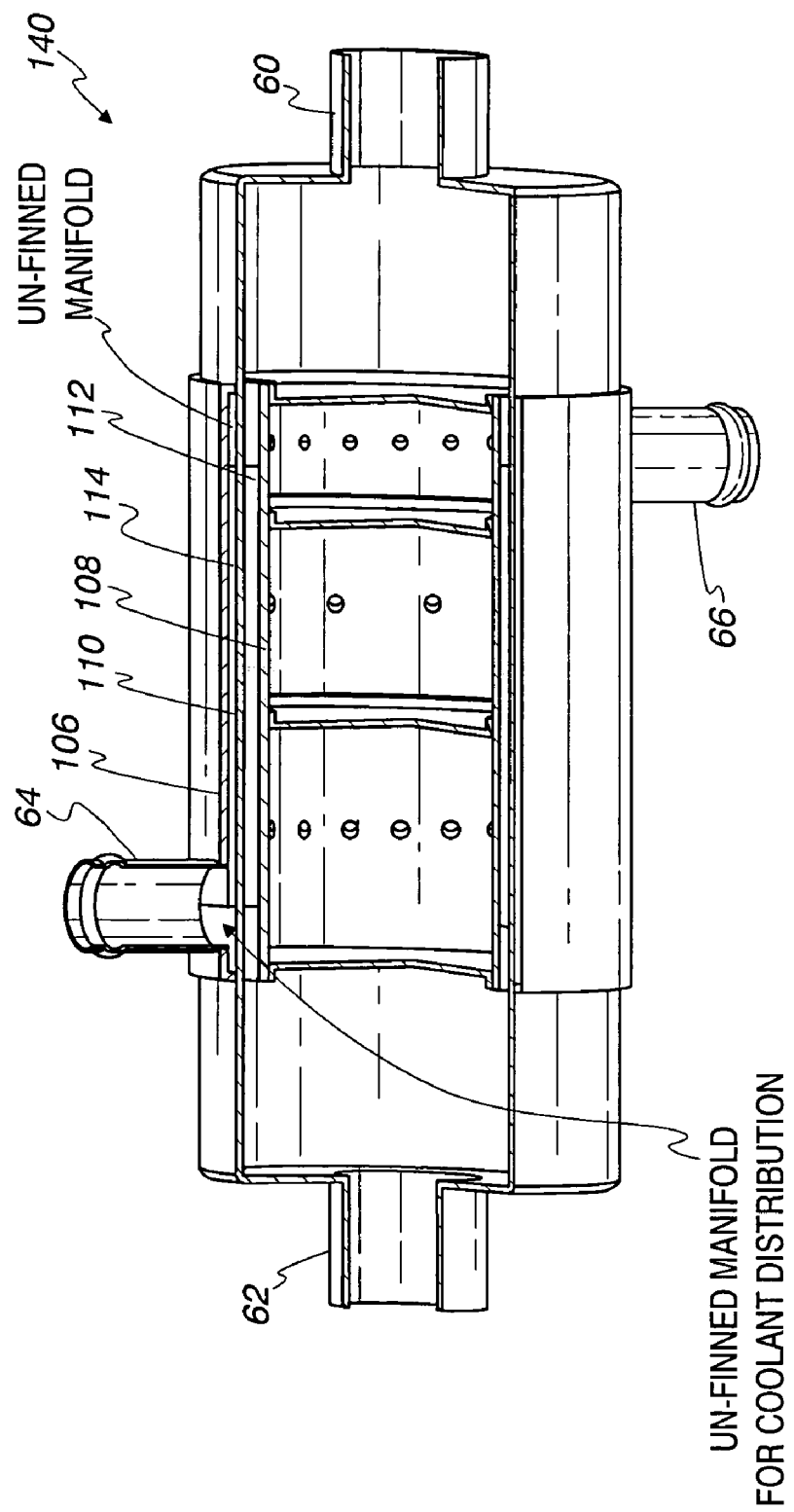
FIG. 13 is a broken perspective view of another integrated heat exchanger and muffler unit embodying the invention.

FIG. 13 shows an alternate embodiment of the unit 140 of FIG. 12, wherein the walls 106 and 108 have been lengthened so that they do extend past the length of the fins 112 and 114, with the unfinned area between the outer cylindrical wall 106 and the intermediate cylindrical wall 110 defining inlet and outlet manifolds for the second fluid that can aid in fluid distribution.

To analyze the feasibility of the nose reduction muffler design implemented into a heat exchanger configuration such as shown in FIG. 1, and as implemented in the integrated heat exchanger and muffler units 50, 120 and 140 of FIGS. 6-13, the linear acoustical plane wave theory was adopted to analytically predict the sound pressure attenuation characteristics of the two muffler models shown in FIGS. 4 and 5. The effects of inlet/out expansion chambers, diameter of the cylindrical outer housing, total heat exchanger core length and the split ratio of total enclosed volume between the resonators on the attenuation characteristics were studied using the acoustical analytical model. The analytical model assumes the sound of speed of air is 434.5 m/s @ $T_{air}=200°$ C. In order to use the plain wave theory, the geometrical dimensions of the expansion chambers must be small compared to the wavelength of the sound, and the lumped-impedance theory is valid if the length of a resonator chamber is less than ⅛ of the wavelength, which, for example, for a 1,200 Hz frequency is calculated as: sound wavelength=$\lambda_{min}$c/f=434.5/1200=0.362 [m]=14.26 [inch]. The analytical model was used to perform a design parametric study for the three resonator model shown in FIG. 5 and included the following:

Effects of the inlet and outlet expansion chamber
    Case studies included no inlet expansion chamber, no outlet expansion chamber and the effects of the length of the two expansion chambers.

Effects of the canister diameter
    Case studies included changing the canister (outer cylindrical wall) diameter, and adjusting the orifices of the three chamber respectively in order to keep the resonance frequencies of the three resonators unchanged as the canister diameter changes.

Effects of the total heat exchanger length
    Case studies included changing the canister diameter, and adjusting the orifices of the low frequency chamber in order to keep the resonance frequencies of the three resonators unchanged as the total heat exchanger length changes.

Effects of the volume split ratio between different resonators
    Case studies included fixing the high frequency chamber and splitting the remaining volume at different ratios between low and medium frequency chamber. The orifice sizes have to change to maintain the same low and medium resonance frequency at these chambers.

Figure 14:
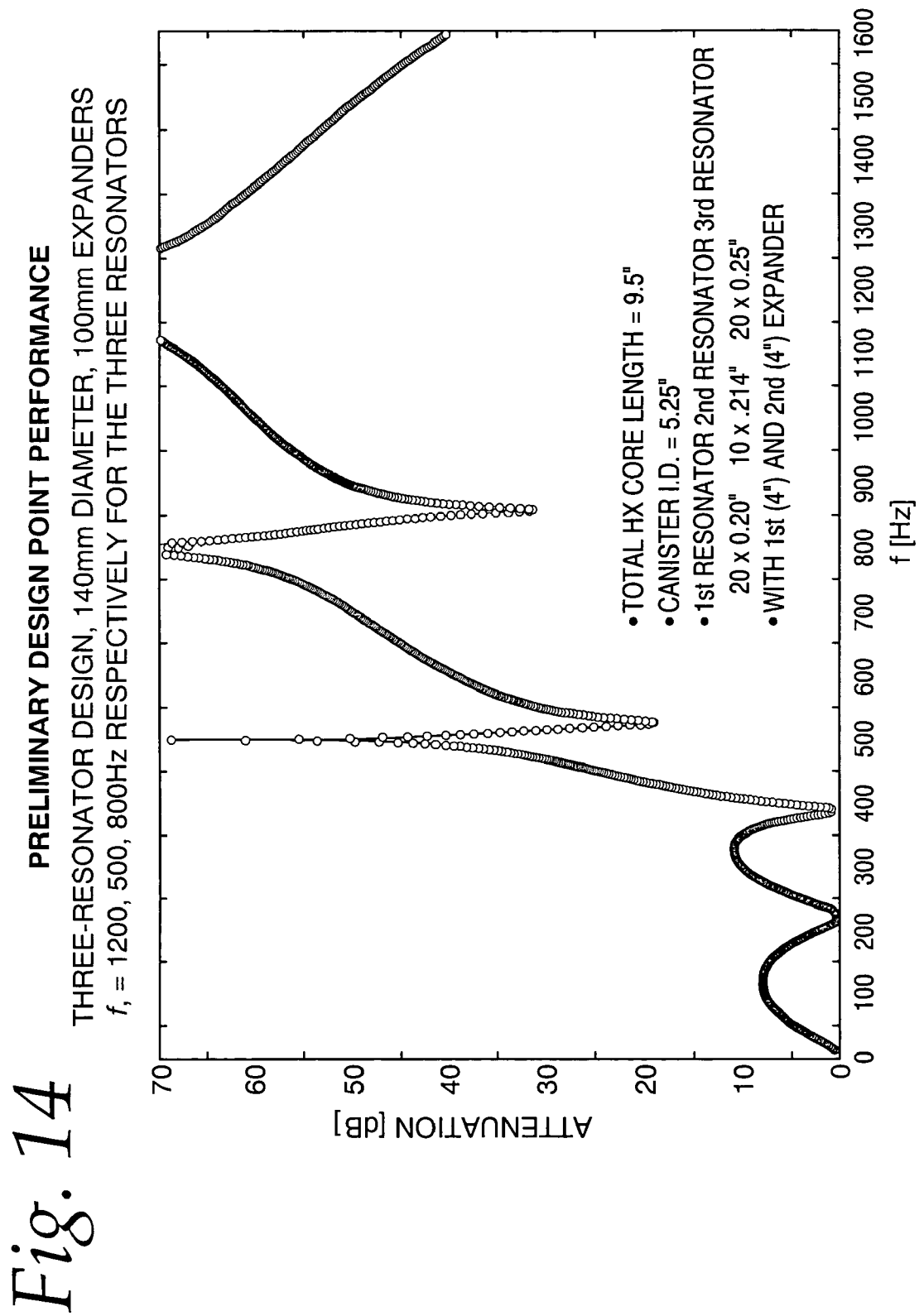
FIG. 14 is a graph showing a typical attenuation curve for integrated heat exchanger and muffler units based on the model of FIG. 5.
Figure 15:
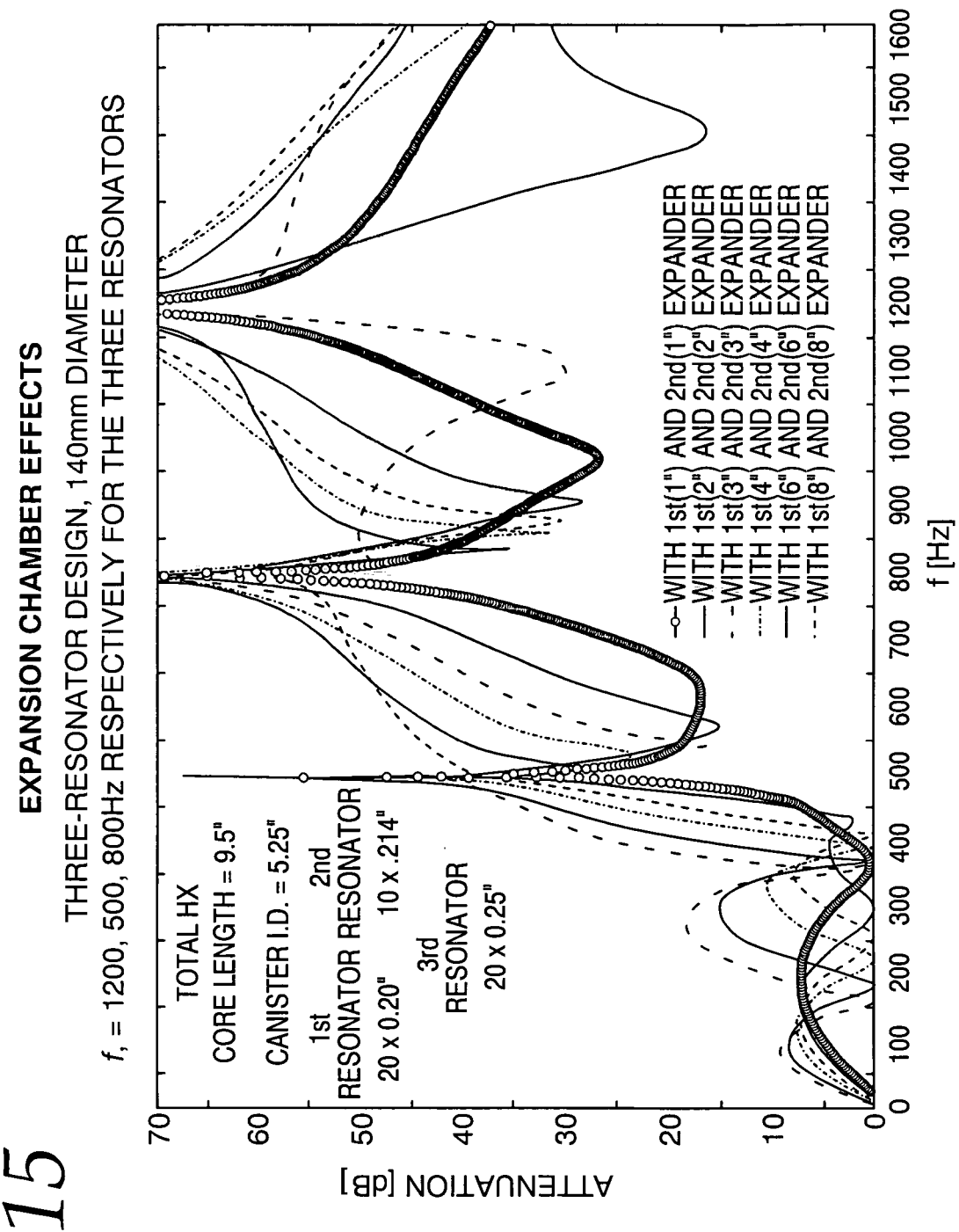
FIG. 15 is a graph illustrating the effects of expansion chambers in integrated heat exchanger and muffler units based on the model of FIG. 5.
Figure 16:
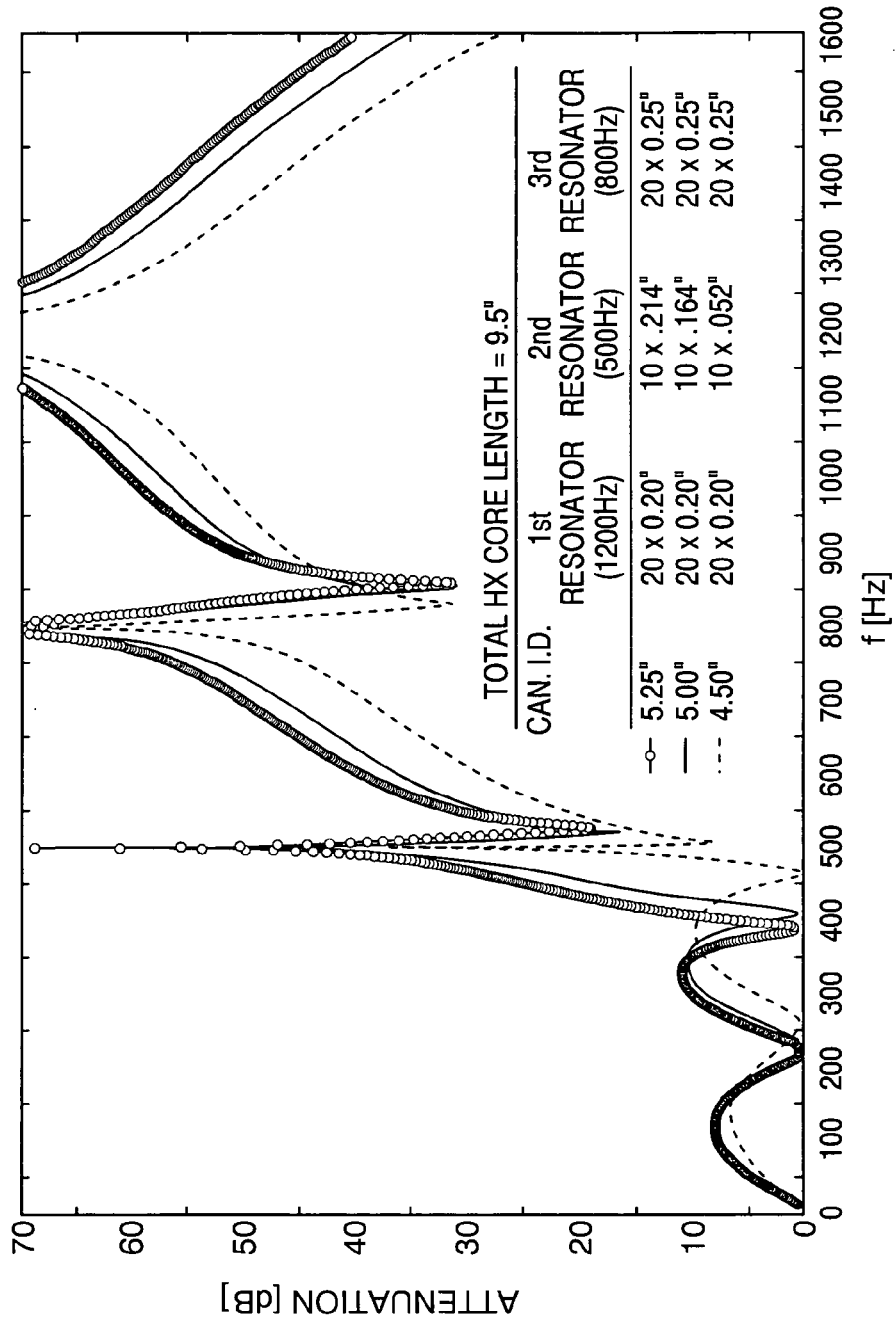
FIG. 16 is a graph illustrating the effects of the outer cylindrical wall diameter in integrated heat exchanger and muffler units based on the model of FIG. 5.
Figure 17:
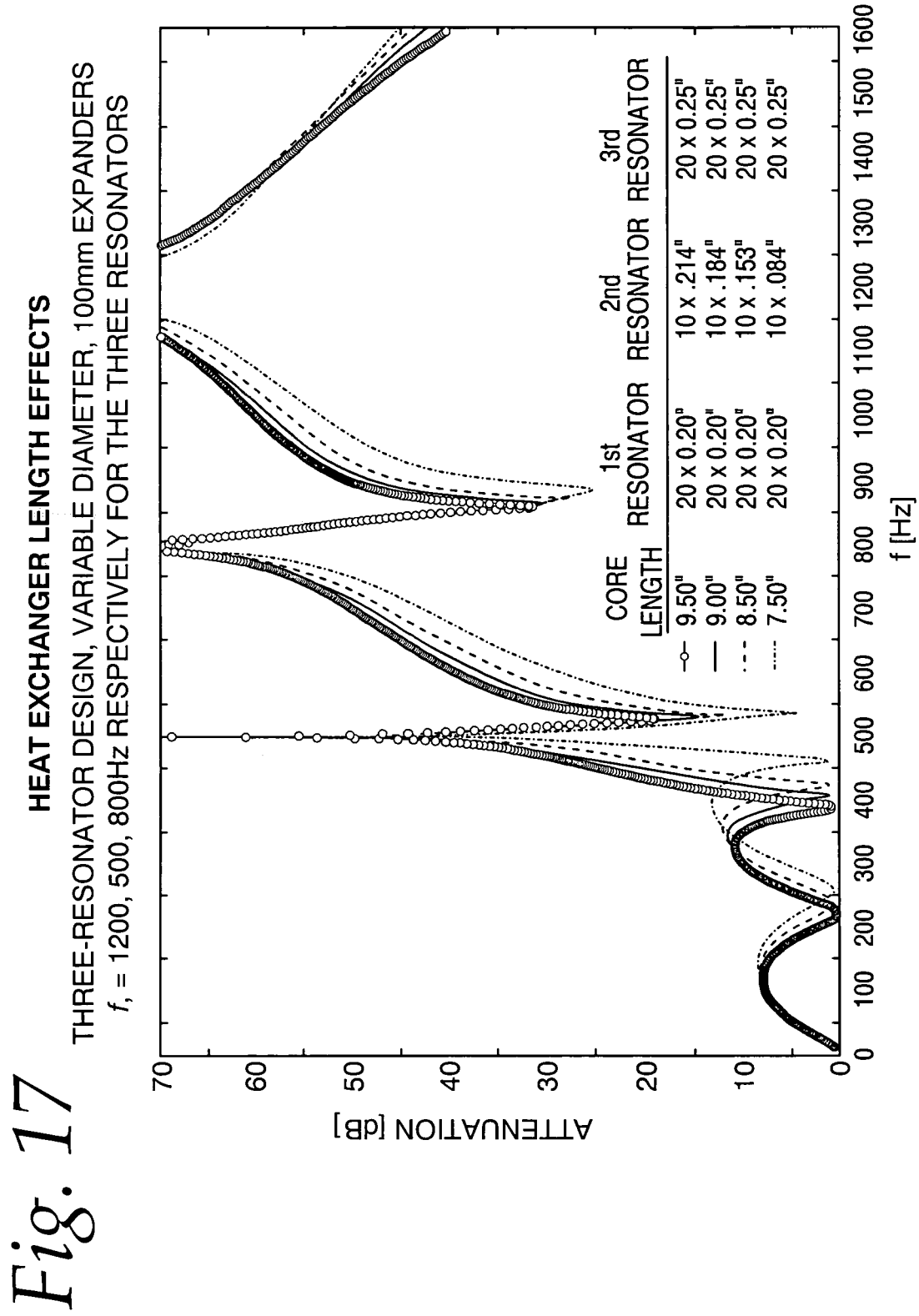
FIG. 17 is a graph illustrating the effects of heat exchanger core length in integrated heat exchanger and muffler units based on the model of FIG. 5.
Figure 18:
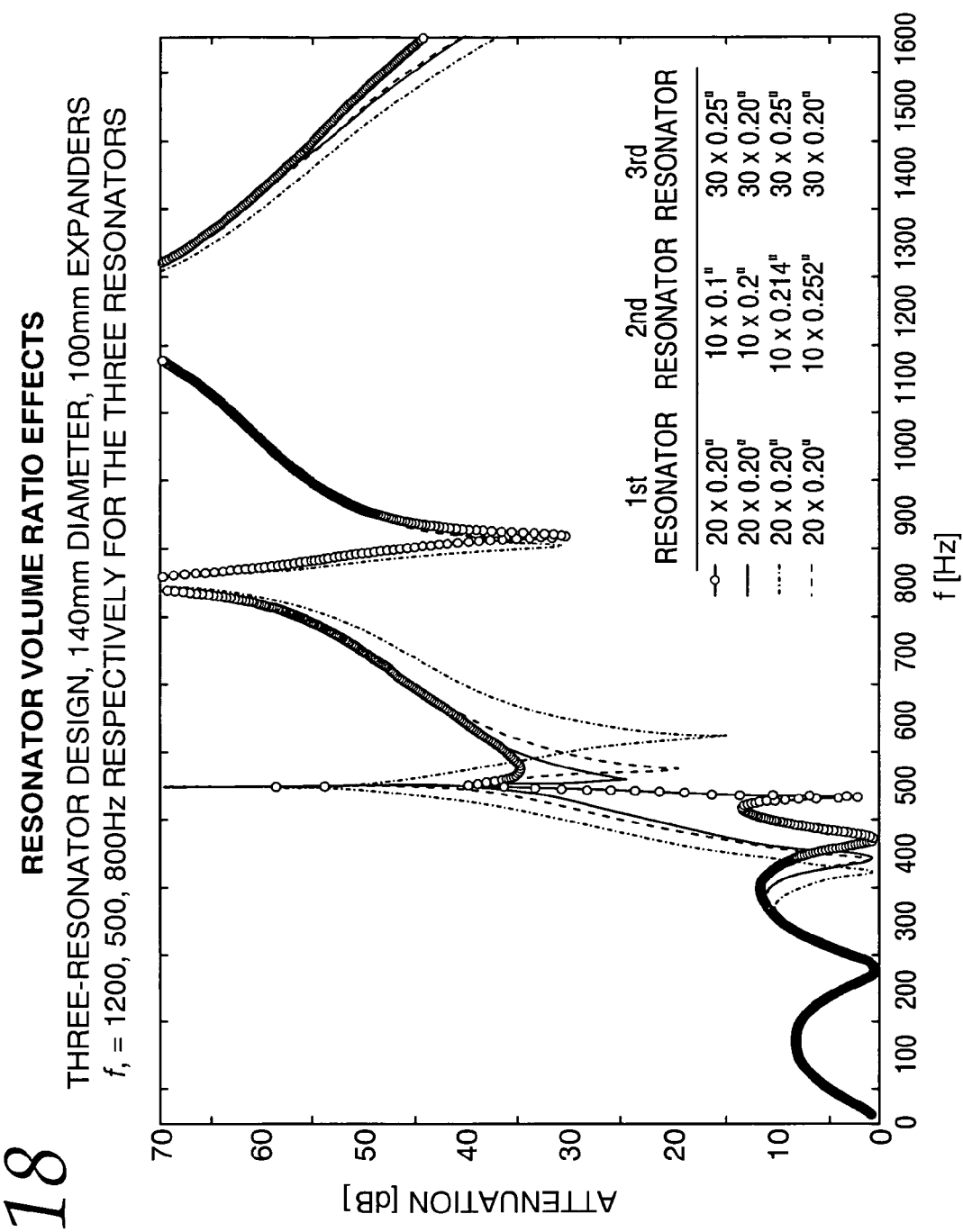
FIG. 18 is a graph illustrating the effects of resonator volume ratios for integrated heat exchanger and muffler units based on the model of FIG. 5.

In the curves shown in FIGS. 14-18, the theoretical predicted results are presented to show the possibility of the aftercooler 10 functioning also as the muffler, with the features incorporated in FIGS. 6-13. FIG. 14 shows a typical attenuation curve for three resonator designs based on FIG. 5. FIG. 15 illustrates the effects of the first and second expansion chambers 30 and 32 in three resonator designs based on FIG. 5. FIG. 16 illustrates the effects of outer cylindrical wall diameter in three resonator designs based on of FIG. 5. FIG. 17 illustrates the effects of heat exchanger core length in three resonator designs based on FIG. 5. FIG. 18 illustrates the effects the resonator volume ratio for three resonator designs based on FIG. 5.

Based on the results of the case studies, a number of conclusions were reached. First, the expanders broaden the frequency response between the resonator frequency design points and low frequency attenuation, with longer expander lengths improving attenuation performance. Additionally, the larger the canister diameter, the broader the frequency response between resonator frequency design points. Furthermore, the design is relatively insensitive to heat exchanger length, but performance improves slightly with longer heat exchanger designs. Additionally, skewing the design in favor of a larger volume low frequency resonator can broaden the frequency response at low frequencies. Finally, literature searches indicate that a tapered inlet diffuser can act as a horn and reduce the effectiveness of the muffler.

The invention claimed is:

1. An integrated heat exchanger and muffler unit for transferring heat between a first fluid and a second fluid, and for muffling the noise of the first fluid, the unit comprising:

a housing extending along an axis between a first end and a second end, the housing including a first inlet for the first fluid, a first outlet for the first fluid, a second inlet for the second fluid, and a second outlet for the second fluid, the first inlet located in the first end of the housing and configured to direct a flow of the first fluid parallel to the axis, the first outlet located in the second end and configured to direct a flow of the first fluid parallel to the axis;

an expansion chamber in the housing and connected to one of the first inlet and outlet for the transfer of the first fluid between the expansion chamber and the one of the first inlet and outlet;

a first fluid flow path in the housing and extending parallel to the axis between the first inlet and outlet and connected to the expansion chamber for the transfer of the first fluid between the first fluid flow path and the expansion chamber;

a resonator in the housing and connected to the first fluid flow; and a second fluid flow path in the housing and extending between the second fluid inlet and the second fluid outlet in heat transfer relation with the first fluid flow path;

wherein the first and second fluid flow paths surround the at least one resonator;
wherein the housing further comprises:
an outer cylindrical wall;
an inner cylindrical wall; and
an intermediate cylindrical wall located radially between the inner and outer cylindrical walls, the inner and intermediate cylindrical walls defining the first fluid flow path, and the intermediate and outer cylindrical walls defining the second fluid flow path.

2. The unit of claim 1 wherein the second fluid flow path surrounds the first fluid path.

3. The unit of claim 1 further comprising a fin located in the first fluid flow path between the inner and intermediate cylindrical walls.

4. The unit of claim 1 wherein the inner cylindrical wall defines a resonator chamber of the resonator, and a plurality of resonator orifices extend through the inner cylindrical wall to connect the first fluid flow path to the resonator chamber.

5. The unit of claim 1 wherein the first and second flow paths are defined by a plurality of spaced parallel planar surfaces, and the resonator comprises a resonator chamber that surrounds the first and second flow paths.

6. The unit of claim 5 further comprising a plurality of parallel plates interleaved with a plurality of bars, the plurality of spaced parallel planar surfaces being surfaces of the plurality of parallel plates.

7. The unit of claim 6 wherein the resonator further comprises a plurality of orifices in selected ones of the plurality of bars, the selected ones enclosing the first flow path.

8. The unit of claim 1 wherein the housing has a cylindrical outer surface.

9. The unit of claim 1 further comprising another expansion chamber in the housing and connected to the other of the first inlet and outlet and to the first fluid flow path to transfer the first fluid between the first fluid flow path and the other of the first inlet and outlet.

10. The unit of claim 1 further comprising another resonator in the housing and connected to the first fluid flow path.

11. An integrated heat exchanger and muffler unit for transferring heat between a first fluid and a second fluid, and for muffling the noise of the first fluid, the unit comprising:
a housing including a first inlet for the first fluid, a first outlet for the first fluid, a second inlet for the second fluid, and a second outlet for the second fluid;
a first expansion chamber in the housing and connected to the first inlet to receive the first fluid therefrom;
a second expansion chamber in the housing and connected to first outlet to direct the first fluid thereto;
a first fluid flow path in the housing and extending from the first expansion chamber to the second expansion chamber;
a resonator in the housing and connected to the first fluid flow path between the first and second expansion chambers; and
a second fluid flow path in the housing and extending between the second fluid inlet and the second fluid outlet in heat transfer relation with the first fluid flow path, the first and second fluid flow paths surrounding the resonator;
wherein the housing further comprises
an outer cylindrical wall;
an inner cylindrical wall; and
an intermediate cylindrical wall located radially between the inner and outer cylindrical walls, the inner and intermediate cylindrical walls defining the first fluid flow path, and the intermediate and outer cylindrical walls defining the second fluid flow path.

12. The unit of claim 11 wherein the second fluid flow path surrounds the first fluid path.

13. The unit of claim 11 further comprising an additional resonator in the housing and connected to the first fluid flow path between the first and second expansion chambers.

14. The unit of claim 13 wherein the housing extends along an axis between and first end and a second end, each of the resonators comprises a resonator chamber having a length dimension extending parallel to the axis, and the length dimension of one of the resonator chambers is unequal to the length dimension of the other resonator chamber.

15. The unit of claim 11 further comprising a fin located in the first fluid flow path between the inner and intermediate cylindrical walls.

16. The unit of claim 11 wherein the inner cylindrical wall defines a resonator chamber of the resonator, and a plurality of resonator orifices extend through the inner cylindrical wall to connect the first fluid flow path to the resonator chamber.

17. The unit of claim 1 wherein the housing extends along an axis between a first end and a second end, and further comprising a plurality of resonators in the housing and connected to the first fluid flow path, each of the resonators including a resonator chamber having a length dimension parallel to the axis.

18. The unit of claim 17 further comprising a fin located in the first fluid flow path.

19. The unit of claim 18 wherein the fin has a length parallel to the axis that is at least as long as the length dimension of anyone of the resonator chambers, but is unequal to the combined length dimensions of all of the resonator chambers.

20. An integrated heat exchanger and muffler unit for transferring heat between a first fluid and a second fluid, and for muffling the noise of the first fluid, the unit comprising:
a housing including a first inlet for the first fluid, a first outlet for the first fluid, a second inlet for the second fluid, and a second outlet for the second fluid;
a first expansion chamber in the housing and connected to the first inlet to receive the first fluid therefrom;
a second expansion chamber in the housing and connected to first outlet to direct the first fluid thereto;
a first fluid flow path in the housing and extending from the first expansion chamber to the second expansion chamber;
a second fluid flow path in the housing and extending between the second fluid inlet and the second fluid outlet in heat transfer relation with the first fluid flow path, the first and second flow paths defined by a plurality of spaced parallel planar surfaces;
a resonator in the housing and connected to the first fluid flow path between the first and second expansion chambers; and
another resonator in the housing and connected to the first fluid flow path.

21. The unit of claim 20 wherein the resonator comprises a resonator chamber that surrounds the first and second flow paths.

22. The unit of claim 21 further comprising a plurality of parallel plates interleaved with a plurality of bars, the plurality of spaced parallel planar surfaces being surfaces of the plurality of parallel plates.

23. The unit of claim 22 wherein the resonator further comprises a plurality of orifices in selected ones of the plurality of bars, the selected ones enclosing the first flow path.

24. The unit of claim 20 wherein the housing has a cylindrical outer surface.

25. An integrated heat exchanger and muffler unit for transferring heat between a first fluid and a second fluid, and for muffling the noise of the first fluid, the unit comprising:
- a housing including a first inlet for the first fluid, a first outlet for the first fluid, a second inlet for the second fluid, and a second outlet for the second fluid;
- a resonator in the housing and connected between the first inlet and outlet to muffle noise in the first fluid; and
- a heat exchanger core in the housing and surrounding the resonator, the heat exchanger core connected to the first and second inlets and outlets to transfer heat between the first and second fluids.

26. The unit of claim 25 further comprising at least one additional resonator connected between the first inlet and outlet to muffle noise in the first fluid and surrounded by the heat exchanger core.

27. The unit of claim 25 wherein the housing further comprises:
- an outer cylindrical wall;
- an inner cylindrical wall; and
- an intermediate cylindrical wall located radially between the inner and outer cylindrical walls, the cylindrical walls defining flow paths for the heat exchanger.

28. The unit of claim 27 wherein the inner cylindrical wall defines a resonator chamber of the resonator, and a plurality of resonator orifices extend through the inner cylindrical wall to connect the first fluid flow path to the resonator chamber.

29. An integrated heat exchanger and muffler unit for transferring heat between a first fluid and a second fluid, and for muffling the noise of the first fluid, the unit comprising:
- a housing including a first inlet for the first fluid, a first outlet for the first fluid, a second inlet for the second fluid, and a second outlet for the second fluid;
- a heat exchanger core in the housing and connected to the first and second inlets and outlets to transfer heat between the first and second fluids; and
- a plurality of resonators in the housing, each of the resonators connected between the first inlet and outlet to muffle noise in the first fluid, each of the resonators including a resonator chamber that surrounds the heat exchanger core and a plurality of resonator orifices in the heat exchanger core to connect the resonator chamber to a flow path for the first fluid.

30. The unit of claim 29 wherein said heat exchanger core comprises a plurality of spaced planer surfaces that define flow paths for the first and second fluids.

31. The unit of claim 29 wherein the heat exchanger core is a bar-plate type construction.

32. The unit of claim 1, wherein the first fluid includes an oxidant, and wherein the integrated unit is located an oxidant flow path of a fuel cell unit to supply oxidant a downstream fuel cell.

33. The unit of claim 3, wherein at least a portion of the fin extends across an opening in the resonator, the opening in the resonator being located between the resonator inlet and the resonator outlet.

* * * * *